June 21, 1955    F. G. LOGAN    2,711,005
POWER TRANSMISSION
Filed Sept. 30, 1949

INVENTOR.
FRANK G. LOGAN
BY
ATTORNEY

United States Patent Office 2,711,005
Patented June 21, 1955

2,711,005

POWER TRANSMISSION

Frank G. Logan, Kirkwood, Mo., assignor to Vickers Incorporated, Detroit, Mich., a corporation of Michigan Application September 30, 1949, Serial No. 118,794

14 Claims. (Cl. 29—25.3)

This invention relates to methods of and apparatus for electroforming rectifier cells.

During their manufacture, rectifier cells, for example, metallic rectifiers of the selenium type, undergo what is known as an electroforming process to improve the stability and the rectification ratio of the cell. Customarily, a plurality of such cells are connected in series, to which series string suitable voltages and current for electroforming are applied by means of a manually adjustable voltage source. Manual control has the disadvantage of requiring constant supervision by an operator and requires considerable forming time, because selenium rectifiers have the characteristics of "freezing" in regard to their forming characteristics if allowed to stay at a fixed potential while capable of accepting a higher potential. For example, in one case, allowing a particular cell to stay at a constant potential below its maximum forming voltage (which results in the forming current falling off) for a period of five minutes may require as much as an hour's additional forming. As it is economically not feasible to have an operator continuously monitor forming current, the increase in forming time due to cells "freezing" becomes very great.

The invention contemplates the use of constant current, controlled and uncontrolled, for electroforming rectifier cells so that the voltage across a cell or a plurality of cells in series is a function only of the cell characteristics at a predetermined constant current. By means of the invention, the voltage across cells being formed automatically increases as the cells form up. This permits forming in the shortest possible time and more particularly allows cells to form individually to their maximum voltage. For example, in a series of three cells, one cell might be short circuited and incapable of forming at all, the second cell might be capable of forming to 22 volts, and the third cell capable of forming to 30 volts. By maintaining constant current through the series connection, each cell will drop only the voltage called for by the current.

In accordance with one embodiment of the invention, a series connected string of rectifier cells is connected to a constant current source shunted by an impedance which may be designed to provide substantially constant current over the entire forming voltage range when the rectifiers are force-cooled, as by submersion in Freon, or to provide a taper to the forming current as the desired final forming voltage is approached. The shunt impedance, by limiting the ultimate voltage, also provides a safety factor against damage to the entire apparatus by high voltage in case of a sharp increase in resistance in the rectifier string, such as an open circuit.

It is, therefore, an object of this invention to provide new and efficient methods of and apparatus for electroforming rectifier cells.

Another object of the invention is to provide methods of and apparatus for electroforming rectifier cells by means of constant current.

A further object of the invention is to provide methods of and apparatus for electroforming rectifier cells by which the voltage across cells being formed automatically increases as the cells form up to thereby maintain the highest voltage the cell is capable of supporting at the selected forming current.

Another object of the invention is to provide new and efficient methods of and apparatus for electroforming rectifier cells, whereby the voltage across a cell or plurality of cells in series is a function only of the cell characteristics at a predetermined constant current.

Another object of the invention is to provide a new and efficient method of and apparatus for limiting the voltage across a constant current energized electroforming circuit, at any desired stage during electroformation, or in case of a sharp increase in resistance such as an open circuit.

Further objects and advantages of the present invention will be apparent from the following description, reference being had to the accompanying drawings wherein a preferred form of the present invention is clearly shown.

Figure 1:
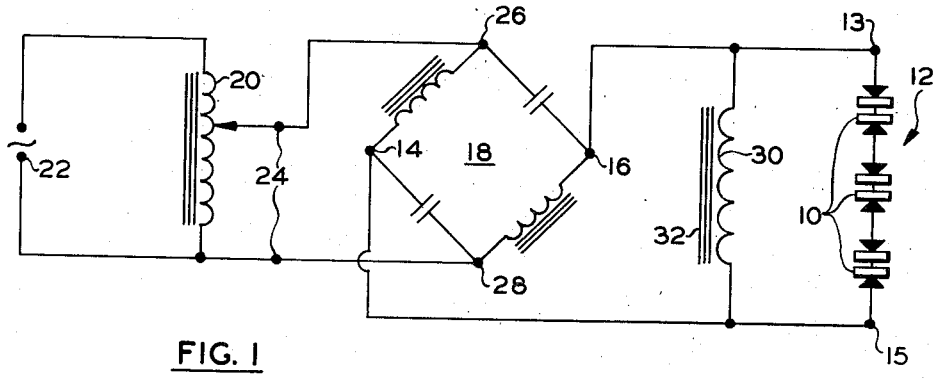
Figure 1 is a circuit diagram illustrating one embodiment of the invention.

As shown in Figure 1, a plurality of rectifier cells 10, for example, selenium rectifier cells, are connected in a series string 12 to undergo the process of electroforming. Since alternating current is used in this embodiment for electroformation, half of the cells may be poled in one direction while the other half are poled in the opposite direction in order to take advantage of and utilize both halves of the alternating current wave. The series string 12 of rectifiers is connected through circuit points 13 and 15 to output terminals 14 and 16 of a constant current source 18, preferably a monocyclic square because of its apparatus efficiency, although other suitable constant current sources such as "tub" transformers, constant current generators, etc., may be used. Power may be supplied to the source 18 by an autotransformer 20 energized from a source of alternating current 22, whose adjustable voltage output 24 is shown connected to input terminals 26 and 28 of the constant current source 18. Adjustment of the input voltage to the source 18 determines the amplitude of the constant current in the ouput circuit connected to the output terminals 14 and 16. An impedance 30, preferably a reactance coil with a suitable saturable magnetic core 32, is shunted across the string 12 of series connected cells to modify, as desired, the current and voltage applied to the string 12 of cells undergoing electroformation.

The forming current passed through a cell is limited by the permissible heating of the cell, and if properly cooled, cells can be run at the most efficient forming current over their entire forming voltage range. Cells may be kept within permissible heating limits during electroformation by subjecting them to a sufficient volumetric air change or by immersion of the cells in Freon or other suitable coolants or refrigerants with high heat transfer characteristics. In such a case, the reactor 30 may be designed to draw only a small exciting current at the maximum desired forming voltage, and the most efficient forming current at constant amplitude may be passed through the rectifiers until the cells reach the final acceptable inverse voltage. As hereinbefore pointed out, with current from a constant current source, the voltage across cells being formed automatically increases as the cells form up since the voltage drop across each cell is a function only of the cell characteristic, and the cell will drop only the voltage called for by the current.

To automatically limit the voltage across the output circuit of the source 18 in case of a sharp increase of resistance such as an open circuit in the string 12, the reactor core 32 may be made of suitable material in order to saturate sharply at a desired voltage limit when it will sharply reduce the reactance of the reactor to provide a more or less shunting effect in accordance with its design. Until such limiting voltage is reached, the reactor may be designed to draw only a small magnetizing current, thus providing substantially constant forming current during the electroformation.

In forming cells without forced cooling, it is desirable to start forming at the most efficient forming current and taper the current as the cell's inverse voltage rises to maintain the cell temperature within permissible limits. Modifications of the characteristics of the reactor 30 permit modification of the characteristics of the current supplied by the constant current source 18 to the string 12 of cells. With suitable design, any desired taper or control of the electroforming current may be obtained.

Figure 2:
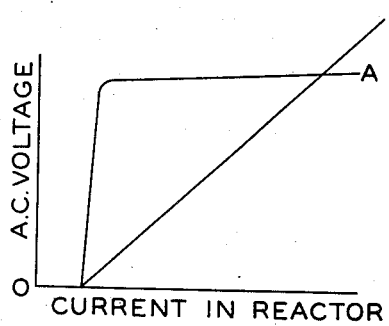
Figure 2 is a chart showing current voltage curves of air core and gapless magnetic core reactors.

If the core 32 be of the gapless type and made of material having a sharp knee at saturation, the power supply will maintain a linear current voltage ratio up to the voltage at which the reactor saturates, at which point no further increase across the load can be obtained. Cells will form off at this voltage and their reverse current drop as forming proceeds. However, up to this saturation voltage, current in the load circuit is essentially constant in amplitude. Curve A in Figure 2 illustrates the current voltage relationship of such a reactor.

Figure 3:
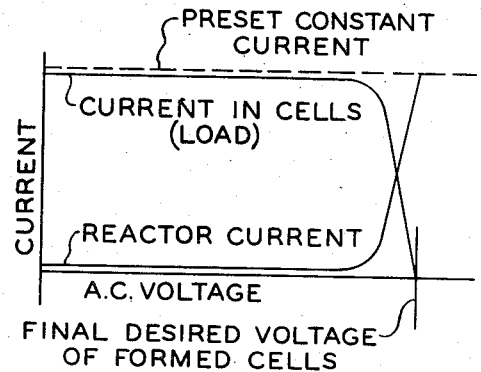
Figure 3 is a chart illustrating simultaneous current voltage conditions of a load and one type of shunt reactor with constant current applied to the parallel combination.

The other extreme of design is, of course, an air core reactor. The reactance of such a reactor will remain constant regardless of voltage across it or current through it. If such a reactor is placed in shunt with the load, the circuit is no longer constant current in so far as the load is concerned. Curve B in Figure 2 shows the current and voltage in an air core reactor. Desired load current control and characteristics between the extremes may be obtained by suitable materials and designs of the reactor coil and core which are well known in the art. The characteristics of a particular design are typified by the curves of Figure 3 which show simultaneous conditions in the load and shunt reactor with constant current applied to the parallel combination.

A practical design for forming cells in air without forced cooling is a reactor with a magnetizable core having a small air gap, and proportioned so that with some over current through the cells initially, the current at the desired ultimate forming voltage would be low enough to prevent overheating of the cells.

Figure 4:
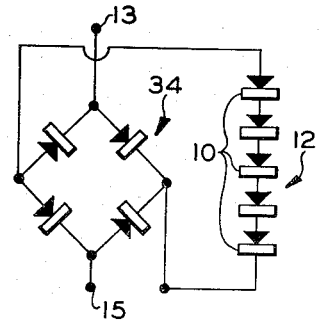
Figure 4 illustrates a means of modifying the circuit of Figure 1 for direct current forming of cells.

The invention is also applicable to the forming of cells with direct current by modifying the circuit of Figure 1 as shown in Figure 4 wherein a rectifier 34 is connected between the series string 12 of cells 10 and the circuit points 13 and 15 which in Figure 1 are connected directly to the output of the constant current source 18. The reactor 30 may be designed to obtain various forming current and voltage controls for the direct current load similar to the controls obtained for the alternating current load in Figure 1 as hereinbefore described.

Figure 5:
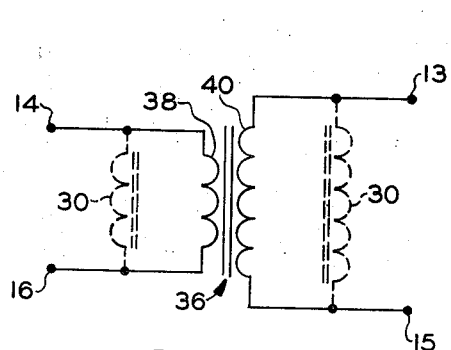
Figure 5 shows the connections for inserting a transformer between the constant current source and the electroforming circuit.

If it is desired to step the output of the source 18 either up or down, a transformer 36 may be coupled between the source 18 and the load as shown in Figure 5. The primary 38 of the transformer is connected to the output terminals 14 and 16 of the source 18, and the transformer secondary 40 is connected to the circuit points 13 and 15 which are connected to the electroforming branch of either Figure 1 or Figure 4. The reactor 30 may be connected either across the secondary or the primary of the transformer as shown in the alternative dotted positions. On either side of the transformer, the reactor will be effectively shunted across the electroforming circuit connected to points 13 and 15. Except for the effect of the transformation ratio, the operation of the circuit will be essentially the same as that of the circuits illustrated in Figure 1 and Figure 1 as modified by Figure 4.

As noted before, a feature of the invention is that the voltage across the cell or a plurality of cells in series is a function only of the cell characteristics at a predetermined constant current. The voltage across the cell is determined by the current through the cell, whereas in other known systems, the applied voltage determines the current through the cell. Tapering or changing the amplitude of the constant current does not destroy the important characteristic of determining the voltage across the cell, which current from a conventional current source will not do.

Although an inductive reactor is preferred, the impedance 30 may be a condenser, a linear resistance, or a non-linear resistance, depending upon the type of control desired. In the case where an air core reactor would be used, a condenser or linear resistance could be substituted. A non-linear resistance will provide some of the control of a saturable reactor. Even a string of rectifiers could be used as a non-linear impedance. However, resistances and rectifiers are power consuming devices and are not as practical as reactors.

Although specific mention of selenium cells has been made, the invention is applicable to any type of semi-conductive cell including metallic and electrolytic rectifier cells which require electroformation. Also, the cell load or string 12 may be one cell or a plurality of cells in series, or a plurality of such strings in parallel.

While the form of embodiment of the invention as herein disclosed constitutes a preferred form, it is to be understood that other forms might be adopted, all coming within the scope of the claims which follow.

What is claimed is as follows:

1. The method of electroforming a rectifier cell including the steps of passing constant current alternating current through the cell, obtaining a voltage drop across the cell which is a function only of the inverse characteristics of the cell at a predetermined constant current, and utilizing the voltage drop to force a portion of the current to be shunted around the cell.

2. An electroforming apparatus comprising a source of constant current alternating current, a rectifier cell coupled to said source, and a reactor effectively connected in parallel with said cell.

3. An electroforming apparatus comprising an electroforming circuit having at least one rectifier cell connected therein, a source of constant current alternating current connected to said circuit for supplying said circuit with constant current alternating current, and means for shunting a portion of said current around said circuit in response to the voltage drop across said circuit.

4. An electroforming apparatus comprising a source of constant current alternating current, an electroforming circuit coupled to said source, said circuit having a plurality of rectifier cells connected therein, and an inductive reactor effectively connected in shunt across said circuit.

5. An electroforming apparatus comprising a monocyclic square having a constant current output, a plurality of rectifier cells coupled to said output, and a reactor effectively connected across said cells.

6. An electroforming apparatus comprising a source of constant current alternating current, a rectifier energized from said source, a rectifier cell connected to said rectifier to receive rectified electroforming current therefrom, and a reactor effectively connected in shunt across said constant current source.

7. An electroforming apparatus comprising a source of constant current, an electroforming circuit connected to said source, said circuit having connected therein at least one rectifier cell, and means responsive to the voltage drop across said circuit for causing a portion of said current to be shunted around said circuit.

8. An electroforming apparatus comprising a source of constant current alternating current, an electroforming circuit coupled to said source, said circuit having at least one semi-conductive device connected therein, and an inductive reactor effectively connected in shunt across said circuit.

9. An electroforming apparatus comprising a source of constant current alternating current, a rectifier energized from said source, an electroforming circuit connected to said rectifier to receive electroforming current therefrom, and means responsive to the voltage drop across said circuit for causing a portion of said current to be shunted around said circuit, said means including an inductive reactor.

10. An apparatus for electroforming semiconductive cells, said apparatus comprising a monocyclic square having a constant current output, an electroforming circuit coupled to said output and adapted to have connected therein semiconductive cells requiring electroforming, and a reactor with a magnetizable core effectively connected in shunt across said output.

11. An apparatus for electroforming semiconductive cells, said apparatus comprising a monocyclic square having a constant current output, an electroforming circuit coupled to said output and adapted to have connected therein semiconductive cells requiring electroforming, and a reactor effectively connected in shunt across said output.

12. An apparatus for electroforming semiconductive devices, said apparatus comprising a source of constant current alternating current, an electroforming circuit coupled to said source and adapted to have connected therein semiconductive devices for the electroforming thereof, and an inductive reactor effectively connected in shunt across said circuit.

13. An apparatus for electroforming semiconductive devices, said apparatus comprising a source of constant current alternating current, an electroforming circuit coupled to said source and adapted to have connected therein semiconductive devices for the electroforming thereof, and an inductive reactor effectively connected in shunt across said circuit, said reactor having a magnetizable core.

14. An electroforming apparatus comprising a source of constant current alternating current, a rectifier energized from said source, said rectifier having input terminals and output terminals, the input terminals being coupled to said source, an electroforming circuit connected to the output terminals of said rectifier to receive electroforming current therefrom, and a reactor with a magnetizable core effectively connected in shunt across the input terminals of said rectifier.

References Cited in the file of this patent

UNITED STATES PATENTS

| Number | Name | Date |
| --- | --- | --- |
| 1,485,076 | Haighton | Feb. 26, 1924 |
| 1,540,307 | Beall | June 2, 1925 |
| 2,459,849 | Stateman | Jan. 25, 1949 |
| 2,476,989 | Martinet et al. | July 26, 1949 |
| 2,497,649 | Amsden | Feb. 14, 1950 |
| 2,510,322 | Shearer | June 6, 1950 |